United States Patent
Bray et al.

(10) Patent No.: US 10,897,476 B2
(45) Date of Patent: *Jan. 19, 2021

(54) REPARSING UNSUCCESSFULLY PARSED EVENT DATA IN A SECURITY INFORMATION AND EVENT MANAGEMENT SYSTEM

(71) Applicant: International Business Machines Corporation, Armonk, NY (US)

(72) Inventors: Rory F. Bray, Keswick Ridge (CA); Michael S. Hume, New Maryland (CA); Christopher A. LeMesurier, Fredericton (CA); Jamie A. R. Wheaton, McLeod Hill (CA)

(73) Assignee: International Business Machines Corporation, Armonk, NY (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/059,309

(22) Filed: Aug. 9, 2018

(65) Prior Publication Data

US 2018/0351982 A1 Dec. 6, 2018

Related U.S. Application Data

(63) Continuation of application No. 15/235,177, filed on Aug. 12, 2016, now Pat. No. 10,069,853.

(51) Int. Cl.
*H04L 29/06* (2006.01)
(52) U.S. Cl.
CPC ...... *H04L 63/1425* (2013.01); *H04L 63/1416* (2013.01); *H04L 63/20* (2013.01)

(58) Field of Classification Search
CPC .. H04L 63/1425; H04L 63/20; H04L 63/1416
See application file for complete search history.

(56) References Cited

U.S. PATENT DOCUMENTS

| 7,844,999 | B1 | 11/2010 | Aguilar-Macias et al. |
| 8,484,230 | B2 | 7/2013 | Harnett et al. |
| 9,069,930 | B1 | 6/2015 | Hart |
| 9,069,954 | B2 | 6/2015 | Anurag |
| 2004/0044912 | A1 | 3/2004 | Connary et al. |
| 2012/0311562 | A1 | 12/2012 | Wang et al. |

(Continued)

OTHER PUBLICATIONS

List of IBM Patents or Patent Applications Treated as Related, Aug. 8, 2018, 2 pages.

*Primary Examiner* — Tri M Tran
(74) *Attorney, Agent, or Firm* — Francis Lammes; Stephen J. Walder, Jr.; Jeffrey S. LaBaw

(57) ABSTRACT

A mechanism is provided for reparsing unsuccessfully parsed event data. Responsive to determining that one or more unsuccessfully parsed event data items exist for a log source, each unsuccessfully parsed event data item of the one or more unsuccessfully parsed event data items is reparsing using an updated device support module associated with the log source. Responsive to the device support module successfully reparsing the unsuccessfully parsed event data item thereby forming a successfully parsed event data item, the successfully parsed event data item is added to a historical record of events associated with the log source. Responsive to the device support module failing to successfully reparse the unsuccessfully parsed event data item, the unsuccessfully parsed event data item is retained in an unsuccessfully parsed event data item data structure.

20 Claims, 4 Drawing Sheets

(56) References Cited

U.S. PATENT DOCUMENTS

2015/0040225 A1    2/2015   Coates et al.
2015/0106867 A1    4/2015   Liang
2017/0118245 A1    4/2017   Tcherchian et al.

REPARSING UNSUCCESSFULLY PARSED EVENT DATA IN A SECURITY INFORMATION AND EVENT MANAGEMENT SYSTEM

BACKGROUND

The present application relates generally to an improved data processing apparatus and method and more specifically to mechanisms for reparsing unsuccessfully parsed event data in a security information and event management (SIEM) system.

In the field of computer security, security information and event management (SIEM) software products and services combine security information management (SIM) and security event management (SEM). A SIM system collects data into a central repository for trend analysis and provides automated reporting for compliance and centralized reporting. A SEM system centralizes the storage and interpretation of logs and allows near real-time analysis that enables security personnel to take defensive actions more quickly. By bringing these two functions together, SIEM systems provide quicker identification, analysis and recovery of security events, SIEM systems also allow compliance managers to confirm that an organization's legal compliance requirements are fulfilled.

That is, a SIEM system collects logs and other security-related documentation for analysis. Most SIEM systems work by deploying multiple collection agents in a hierarchical manner to gather security-related events from networked log sources such as end-user devices, servers, network equipment, and even specialized security equipment such as firewalls, antivirus or intrusion prevention systems. The collectors forward events to a centralized management console, which performs inspections and flags anomalies.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for reparsing unsuccessfully parsed event data. The illustrative embodiment determines whether one or more unsuccessfully parsed event data items exist for a log source, where an unsuccessfully parsed event data item is an event data item where previous parsing failed. The illustrative embodiment reparses each unsuccessfully parsed event data item of the one or more unsuccessfully parsed event data items using an updated device support module associated with the log source in response to one or more unsuccessfully parsed event data items existing. The illustrative embodiment adds the successfully reparsed event data item to a historical record of events associated with the log source in response to the device support module successfully parsing the unsuccessfully parsed event data item thereby forming a successfully parsed event data item. The illustrative embodiment retains the unsuccessfully parsed event data item in an unsuccessfully parsed event data item data structure in response to the device support module failing to successfully reparse the unsuccessfully parsed event data item.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions that, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
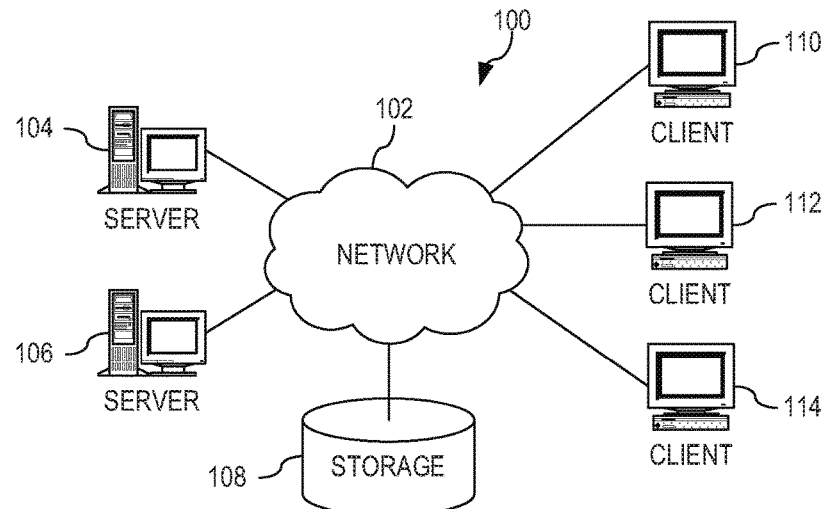
FIG. 1 is an example diagram of a distributed data processing system in which aspects of the illustrative embodiments may be implemented.

Again, a security information and event management (SIEM) system collects logs and other security-related documentation for analysis. That is, a SIEM system receives event data from networked log sources such as end-user devices, servers, network equipment, and even specialized security equipment such as firewalls, antivirus or intrusion prevention systems. The event data is parsed by a respective device support module (DSM) associated with the log source into a parsable format that is stored in the SIEM system. Anytime there are changes to a version of log source, a reported event may not be handled properly by the associated DSM. That is, the new version of the log source may cause event data to be unparsable by the associated DSM and thus, the event data remains unparsed and is stored as unknown event data in the SIEM system. When event data is unsuccessfully parsed, consumers currently have to open a support ticket requiring a new version of the DSM be issued.

The problem with this approach is that, for the time required to update the version of the DSM, event data being logged is not usable in the SIEM database. While this is not technically a data outage, failing to parse and properly store event data causes "gaps" in the customer's historical record, which may contain very important information on attacks/events that have happened on the customer's networks. Currently, in many cases, properly evaluating the unsuccessfully parsed events is very difficult or impossible for the SIEM system. That is, while the unsuccessfully parsed event data is stored, currently, the unsuccessfully parsed event data is never reprocessed to fill in those "gaps" in the historical record.

Therefore, the illustrative embodiments provide mechanisms for reparsing unsuccessfully parsed event data in a SIEM system. The mechanisms utilize the most recent DSM associated with the device to look back over time and attempt to reparse any unsuccessfully parsed event data using new rules instantiated in the DSM and then store the parsed data appropriately in the associated historical record. This ensures that holes in the historical record are filled over time and thus, may be viewed and/or evaluated for the potential impact to the network or systems.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
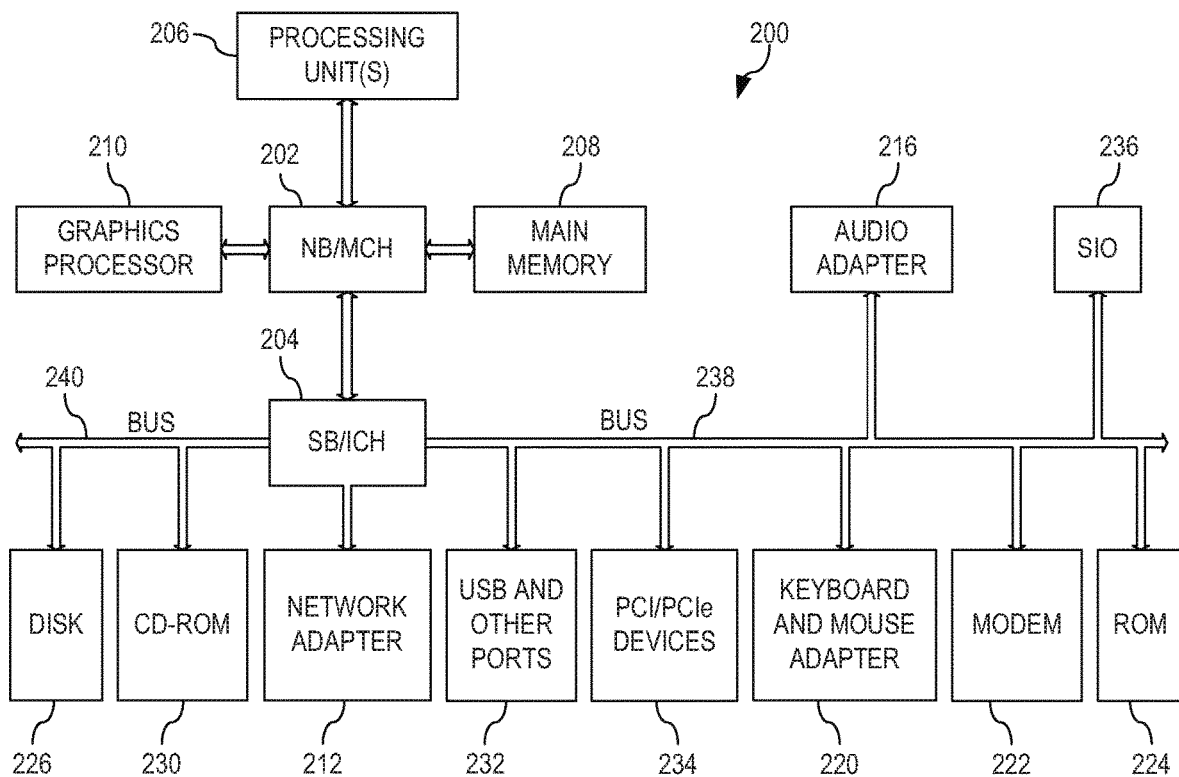
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a re-parsing process for reparsing unsuccessfully parsed event data that was previously attempted to be parsed in a security information and event management (SIEM) system. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates a re-parsing process that reparses unsuccessfully parsed event data in a SIEM system.

As noted above, the mechanisms of the illustrative embodiments utilize specifically configured computing devices, or data processing systems, to perform the operations for reparsing unsuccessfully parsed event data in a SIM system. These computing devices, or data processing systems, may comprise various hardware elements that are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect, to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to reparsing unsuccessfully parsed event data in a SIEM system.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
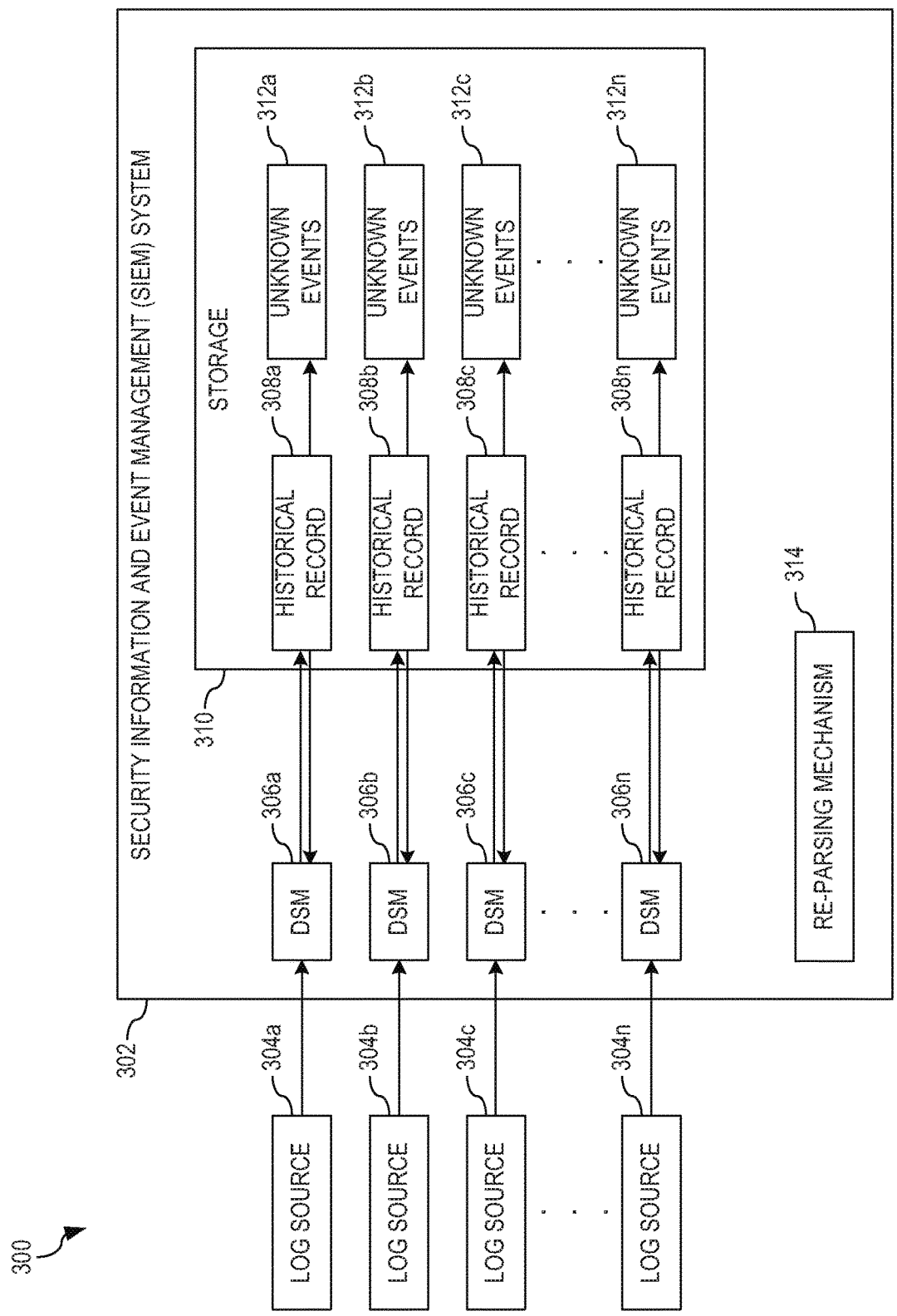
FIG. 3 depicts a functional block diagram of a reparsing mechanism that reparses unsuccessfully parsed event data in a security information and event management (SIEM) system in accordance with an illustrative embodiment.

FIG. 3 depicts a functional block diagram of a reparsing mechanism that reparses unsuccessfully parsed event data in a security information and event management (SIEM) system in accordance with an illustrative embodiment. Data processing system 300, which is a data processing system such as data processing 200 of FIG. 2, comprises SIEM system 302 and a plurality of log sources 304a-304n. Again, SIEM system 302 is a system that combines security information management (SIM) and security event management (SEM). SIEM system 302 further comprises a plurality of device support modules (DSMs) 306a-306n. Each DSM in DSMs 306a-306n is a configuration mechanism that parses events from its associated log source and converts them to a standard taxonomy format that can be utilized by the SIEM system 302. Log sources 304a-304n are any external device, system, or cloud service that is configured to either send events to SIEM system 302 or be collected by SIEM system 302. Once a log from a log source in log sources 304a-304n is parsed by its associated DSM in DSMs 306a-306n, the parsed data is stored in an associated historical record of a plurality of historical records 308a-308n within storage 310.

However, as discussed previously, anytime there are changes to a log source, such as an update in the software version of the log source, a new event that the SIEM is not prepared to parse, or the like, a reported event may not be handled properly by the associated DSM. That is, for example, the new version of software installed on log source 304a may cause event data from log source 304a to be unparsable by associated DSM 306a and thus, the event data remains unparsed and SIEM system 302 stores the unsuccessfully parsed event data as associated unknown event data in unknown events data structure 312a in storage 310. That is, for any unsuccessfully parsed event data by DSMs 306a-306n due to changes in an associated log source 304a-304n, DSMs 306a-306n have an associated unknown events data structure 312a-312n in which to store the unsuccessfully parsed event data. Thus, this unsuccessfully parsed event data presents a problem for the SEM as the unsuccessfully parsed event data may contain important information as to what has gone on within the network at that point in time, such as an attack, unauthorized access event, or the like. When these unsuccessfully parsed event data events are encountered, a deficiency is identified within the DSM that must be rectified. Through normal maintenance, each of DSMs 306a-306n is updated in order to parse such unsuccessfully parsed event data. However, current SEM systems do not go back and reprocess unsuccessfully parsed event data.

In accordance with the illustrative embodiments, re-parsing mechanism 314 within SEM system 302 monitors the DSMs 306a-306n associated with the log sources 304a-304n to determine whether one or more of DSMs 306a-306n has been updated using temporal update information associated with each DSM and the last time re-parsing mechanism 314 was executed. Response to re-parsing mechanism 314 determining that one or more of DSMs have been updated, re-parsing mechanism 314 searches each unknown events data structure 312 associated with each DSM of the one or more DSMs that has been updated for one or more unsuccessfully parsed event data items. For each updated DSM, if re-parsing mechanism 314 identifies one or more unsuccessfully parsed event data items in the associated unknown events data structure, re-parsing mechanism 314 causes the DSM to reparse the one or more unsuccessfully parsed event data items. For each one or more unsuccessfully parsed event data items, responsive to the DSM being able to parse the event data correctly, the re-parsing mechanism 314 in conjunction with the DSM stores the parsed data in temporal order within the associated historical record 308 and removes the associated unsuccessfully parsed event data from the unknown events data structure 312. Responsive to the DSM failing to parse the event data correctly, the re-parsing mechanism 314 in conjunction with the DSM leaves the unsuccessfully parsed event data in the unknown events data structure 312. Once all the one or more unsuccessfully parsed event data items from the unknown events data structure 312 are reprocessed, re-parsing mechanism 314 notifies the MEM of the one or more newly parsed event data items that have been added to the associated historical record 308 so that SEM system 302 may provide a holistic view of an organization's information technology (IT) security to the customer for use in further IT Security development. For any unsuccessfully parsed event data items after the reprocessing, re-parsing mechanism 314 issues a notification to administrators so that the failure of the DSM may be addressed. That is, while the customer may normally open a support ticket when event data is unsuccessfully parsed, since re-parsing mechanism 314 performs the reparsing based on updates to the DSM, the illustrative embodiments take a proactive stance on addressing the customer's needs when one or more unsuccessfully parsed event data items are identified.

Thus, the illustrative embodiments provide a re-parsing mechanism 314 that identifies when a DSM has been updated, triggers a process that goes back through time and reparses one or more unsuccessfully parsed event data items, and closes the gap in historical data. Closing this gap removes purported data outage and creates a more continuous historical record for the SIEM system and the SIEM users to work with.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firework, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that, the instructions, which execute via the processor of the computer or other programmable data processing apparatus, create means for implementing the functions acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
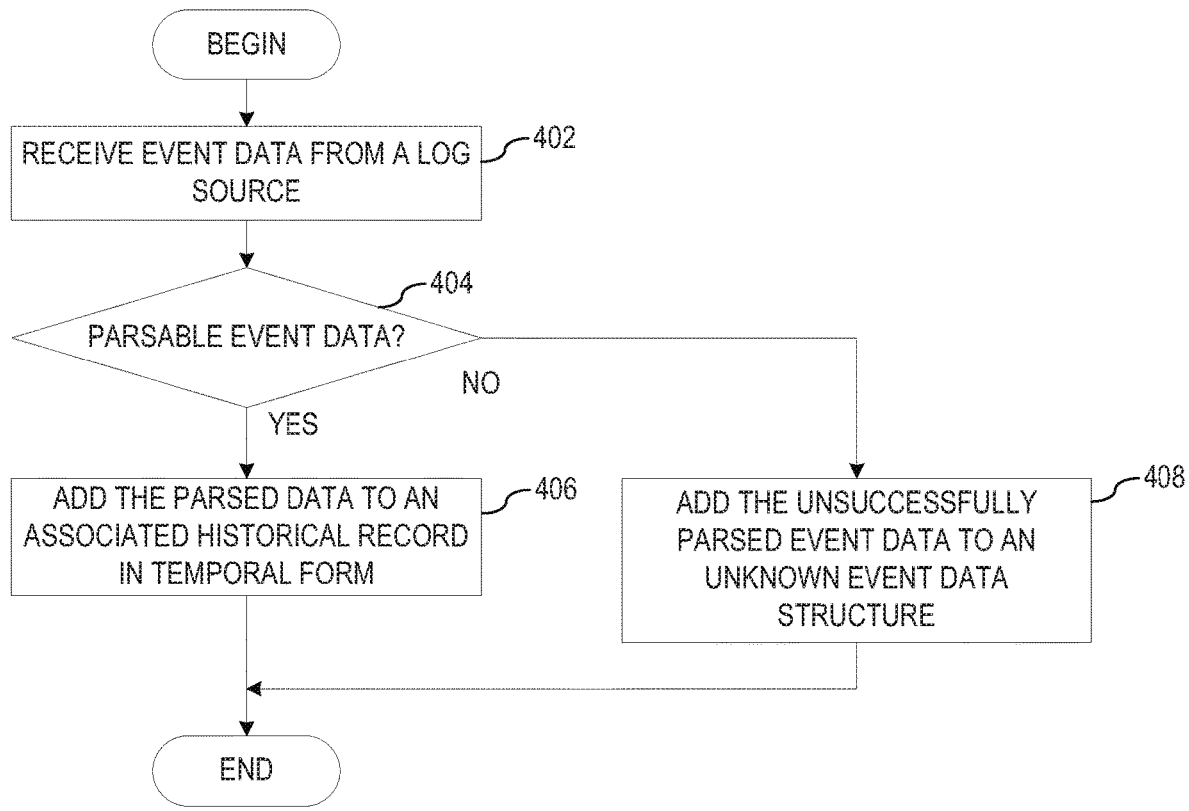
FIG. 4 depicts a flowchart of the operation performed by a security information and event management (SIEM) system in parsing event data in accordance with an illustrative embodiment.

FIG. 4 depicts a flowchart of the operation performed by a security information and event management (SIEM) system in parsing event data in accordance with an illustrative embodiment. As the operation begins, the SIEM system receives event data from a log source (step 402) such as an external device, system, or cloud service that is configured to either send events to the SIEM system or be collected by the SIEM system. Responsive to receiving the event data, an associated device support module (DSM), within the SIEM system, attempts to parse the event data (step 404). If at step 404 the DSM is able to parse the data, the SIEM system adds the parsed data to an associated historical record in temporal form (step 406) so as to provide an accurate historical record of the events experienced by the log source, with the operation ending thereafter. If at step 404 the DSM is unable to parse the data, the SIEM system adds the unsuccessfully parsed event data to an unknown events data structure (step 408), with the operation ending thereafter.

Figure 5:
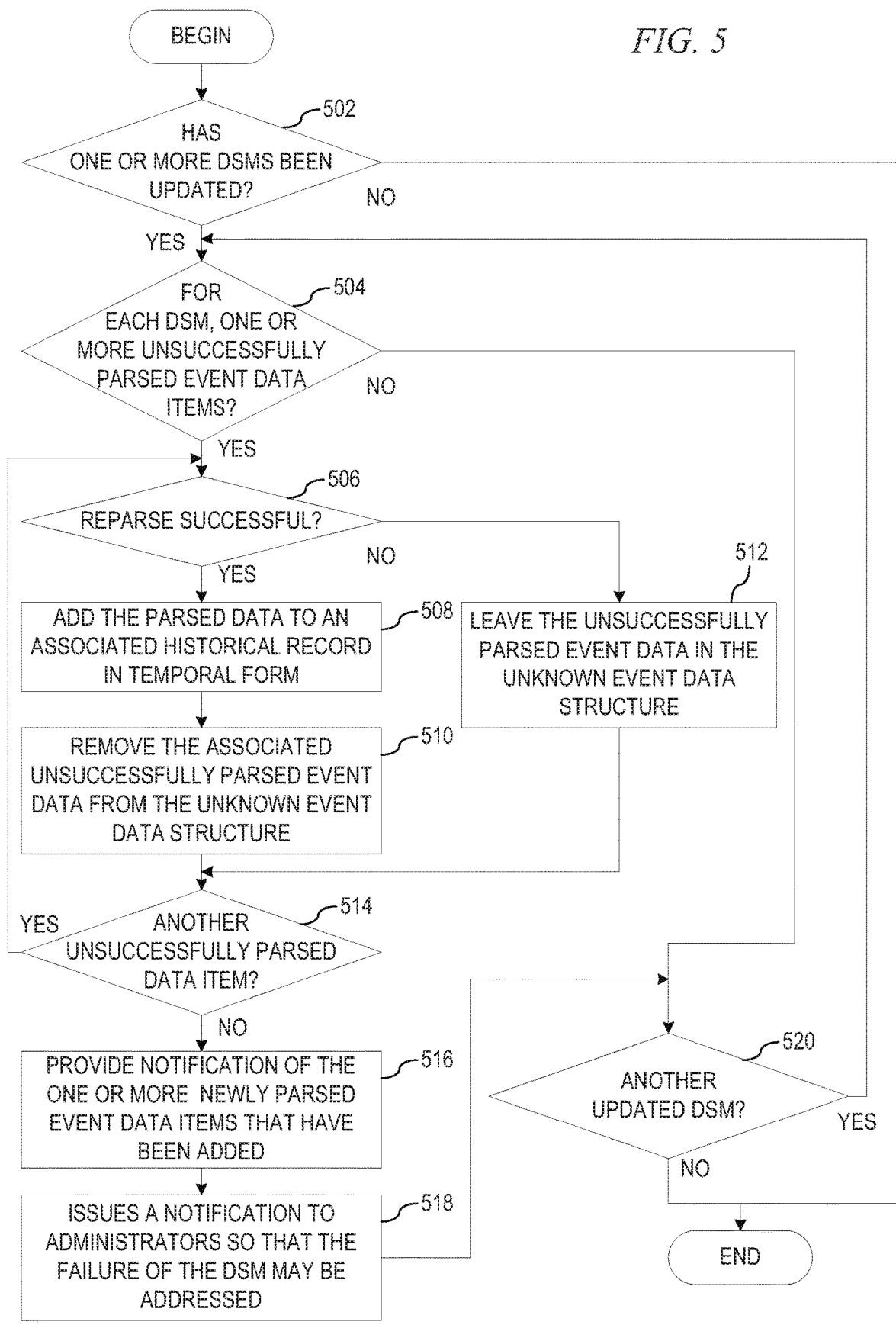
FIG. 5 depicts a flowchart of the operation performed by a security information and event management (SIEM) system in reparsing unsuccessfully parsed event data in accordance with an illustrative embodiment.

FIG. 5 depicts a flowchart of the operation performed by a security information and event management (SIEM) system in reparsing unsuccessfully parsed event data in accordance with an illustrative embodiment. It should be noted that the operation described in FIG. 5 could be performed in conjunction with the operation described in FIG. 4 or as a standalone operation. As the operation begins, a re-parsing mechanism within the SIEM system monitors a plurality of device support modules (DSMs) associated with a plurality of log sources to determine whether one or more of the DSMs has been updated (step 502) using temporal update information associated with each DSM and the last time the re-parsing mechanism was executed. If at step 502 the re-parsing mechanism determines that none of the DSMs has been updated, then the operation terminates. However, if at step 502 the re-parsing mechanism determines that one or more of the DSMs has been updated, then the re-parsing mechanism searches each unknown events data structure associated with each DSM of the one or more DSMs that has been updated for one or more unsuccessfully parsed event data items (step 504). For each updated DSM, if at step 504 the re-parsing mechanism fails to identify one or more unsuccessfully parsed event data items in the associated unknown events data structure, the operation proceeds to step 520 described below. For each updated DSM, if at step 504 the re-parsing mechanism identifies one or more unsuccessfully parsed event data items in the associated unknown events data structure, the re-parsing mechanism causes the DSM to reparse the one or more unsuccessfully parsed event data items one by one (step 506).

For each one or more unsuccessfully parsed event data items, if at step 506 the DSM is able to successfully parse the event data correctly, the re-parsing mechanism in conjunction with the DSM adds the parsed data in temporal order to the associated historical record (step 508) and removes the associated unsuccessfully parsed event data from the unknown event data structure (step 510). For each one or more unsuccessfully parsed event data items, if at step 506 the DSM is unable to successfully parse the event data correctly, the re-parsing mechanism in conjunction with the DSM leaves the unsuccessfully parsed event data in the unknown events data structure (step 512). From steps 510 and 512, the re-parsing mechanism then determines whether there is another unsuccessfully parsed event data item to process (step 514). If at step 514 there is another unsuccessfully parsed event data item to process, the operation returns to step 506. If at step 514 there are no more unsuccessfully parsed event data items for that DSM, the re-parsing mechanism notifies the SIEM of the one or more newly parsed event data items that have been added to the associated historical record (step 516) so that SIEM system may provide a holistic view of an organization's information technology (IT) security to the customer for use in further IT Security development. For any unsuccessfully parsed event data items after the reprocessing, the re-parsing mechanism issues a notification to administrators so that the failure of the DSM may be addressed (step 518).

From step 518 or if at step 504 the re-parsing mechanism fails to identify one or more unsuccessfully parsed event data items in the associated unknown events data structure, the re-parsing mechanism determines whether there is another updated DSM in the identified one or more DSMs that has been updated (step 520). If at step 520 there is another updated DSM, then the operation returns to step 504. If at step 520 there is not another updated DSM, then the operation terminates.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for reparsing unsuccessfully parsed event data in a SIEM system. The mechanisms utilize the most recent DSM associated with the device to look back over time and attempt to reparse any unsuccessfully parsed event data using new rules instantiated in the DSM and then store the parsed data appropriately in the associated historical record. This ensures that gaps in the historical record are filled over time and thus, may be viewed and/or evaluated for the potential impact to the network or systems. Closing this gap removes purported data outage and creates a more continuous historical record for the SIEM system and the SIEM users to work with. Further, while the customer may normally open a support ticket when event data is unsuccessfully parsed, since the re-parsing mechanism performs the reparsing based on updates to the DSM, the illustrative embodiments take a proactive stance on addressing the customer's needs when one or more unsuccessfully parsed event data items are identified.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory coupled to the processor, for reparsing unsuccessfully parsed event data, the method comprising:
   determining, by the processor, whether one or more unsuccessfully parsed event data items exist for a log source, wherein an unsuccessfully parsed event data item is an event data item where previous parsing failed, wherein the determining whether the one or more unsuccessfully parsed event data items exist for the log source is performed based on the device support module associated with the log source being updated;
   responsive to one or more unsuccessfully parsed event data items existing, reparsing, by the processor, each unsuccessfully parsed event data item of the one or more unsuccessfully parsed event data items using an updated device support module associated with the log source; and
   responsive to the device support module failing to successfully reparse the unsuccessfully parsed event data item, retaining, by the processor, the unsuccessfully parsed event data item in an unsuccessfully parsed event data item data structure.

2. The method of claim 1, wherein the successfully parsed event data item is added to the historical record of events associated with the log source in temporal order.

3. The method of claim 1, wherein adding the successfully parsed event data item to the historical record of events associated with the log source further comprises:
   providing, by the processor, a holistic view of an organization's information technology (IT) security to the customer for use in further IT security development using the historical record of events.

4. The method of claim 1, wherein retaining the unsuccessfully parsed event data item in an unsuccessfully parsed event data item data structure further comprises:
   issuing, by the processor, a notification to an administrator so that the failure of the device support module is addressed.

5. The method of claim 1, wherein the data processing system is a security information and event management (SIEM) system.

6. The method of claim 1, wherein the reparsing each unsuccessfully parsed event data is performed in conjunction with parsing new unparsed event data.

7. The method of claim 1, further comprising:
   responsive to the device support module successfully reparsing the unsuccessfully parsed event data item thereby forming a successfully parsed event data item, adding, by the processor, the successfully parsed event data item to a historical record of events associated with the log source.

8. A computer program product comprising a computer readable storage medium having a computer readable program stored therein, wherein the computer readable program, when executed on a computing device, causes the computing device to:
   determine whether one or more unsuccessfully parsed event data items exist for a log source, wherein an unsuccessfully parsed event data item is an event data item where previous parsing failed, wherein the computer readable program causing the computing device to determine whether the one or more unsuccessfully parsed event data items exist for the log source is performed based on the device support module associated with the log source being updated;
   responsive to one or more unsuccessfully parsed event data items existing, reparse each unsuccessfully parsed event data item of the one or more unsuccessfully parsed event data items using an updated device support module associated with the log source; and
   responsive to the device support module failing to successfully reparse the unsuccessfully parsed event data item, retain the unsuccessfully parsed event data item in an unsuccessfully parsed event data item data structure.

9. The computer program product of claim 8, wherein the successfully parsed event data item is added to the historical record of events associated with the log source in temporal order.

10. The computer program product of claim 8, wherein the computer readable program to add the successfully parsed event data item to the historical record of events associated with the log source further causes the computing device to:
    provide a holistic view of an organization's information technology (IT) security to the customer for use in further IT security development using the historical record of events.

11. The computer program product of claim 8, wherein the computer readable program to retain the unsuccessfully parsed event data item in an unsuccessfully parsed event data item data structure further causes the computing device to:
    issue a notification to an administrator so that the failure of the device support module is addressed.

12. The computer program product of claim 8, wherein the computer readable program causing the computing device to reparse each unsuccessfully parsed event data is performed in conjunction with parsing new unparsed event data.

13. The computer program product of claim 8, wherein the computer readable program further causes the computing device to:
    responsive to the device support module successfully reparsing the unsuccessfully parsed event data item thereby forming a successfully parsed event data item, add the successfully parsed event data item to a historical record of events associated with the log source.

14. A system comprising:
    a processor, and
    a memory coupled to the processor, wherein the memory comprises instructions which, when executed by the processor, cause the processor to:
    determine whether one or more unsuccessfully parsed event data items exist for a log source, wherein an unsuccessfully parsed event data item is an event data item where previous parsing failed, wherein the instructions causing the processor to determine whether the one or more unsuccessfully parsed event data items exist for the log source is performed based on the device support module associated with the log source being updated;
    responsive to one or more unsuccessfully parsed event data items existing, reparse each unsuccessfully parsed event data item of the one or more unsuccessfully parsed event data items using an updated device support module associated with the log source; and
    responsive to the device support module failing to successfully reparse the unsuccessfully parsed event data item, retain the unsuccessfully parsed event data item in an unsuccessfully parsed event data item data structure.

15. The system of claim 14, wherein the successfully parsed event data item is added to the historical record of events associated with the log source in temporal order.

16. The system of claim 14, wherein the instructions to add the successfully parsed event data item to the historical record of events associated with the log source further cause the processor to:

provide a holistic view of an organization's information technology (IT) security to the customer for use in further IT security development using the historical record of events.

17. The system of claim 14, wherein the instructions to retain the unsuccessfully parsed event data item in an unsuccessfully parsed event data item data structure further cause the processor to:

issue a notification to an administrator so that the failure of the device support module is addressed.

18. The system of claim 14, wherein the system is a security information and event management (SIEM) system.

19. The system of claim 14, wherein the instructions causing the processor to reparse each unsuccessfully parsed event data is performed in conjunction with parsing new unparsed event data.

20. The system of claim 14, wherein the instructions further cause the processor to:

responsive to the device support module successfully reparsing the unsuccessfully parsed event data item thereby forming a successfully parsed event data item, add the successfully parsed event data item to a historical record of events associated with the log source.

* * * * *